United States Patent [19]

Stock

[11] 4,137,101
[45] Jan. 30, 1979

[54] APPARATUS AND METHOD FOR REMOVING TIRES FROM WHEELS

[75] Inventor: Harold R. Stock, Overland, Mo.

[73] Assignee: Wiese Planning and Engineering, Inc., St. Louis, Mo.

[21] Appl. No.: 874,112

[22] Filed: Feb. 1, 1978

[51] Int. Cl.² .......................... B60C 25/00; B23K 7/00
[52] U.S. Cl. .................................. 148/9 R; 83/925 R; 148/9.6; 157/11; 157/13; 266/48; 266/54
[58] Field of Search .................. 148/9, 9.6; 157/11, 157/13; 83/925 R; 266/54, 48

[56] References Cited

U.S. PATENT DOCUMENTS

| 1,638,476 | 8/1927 | Dalton | 157/11 |
| 3,733,941 | 5/1973 | Geyer, Jr. | 157/13 |
| 3,885,292 | 5/1975 | Sharp et al. | 157/13 |
| 3,922,942 | 12/1975 | Fawcett et al. | 83/925 R |

*Primary Examiner*—W. Stallard
*Attorney, Agent, or Firm*—Gravely, Lieder & Woodruff

[57] ABSTRACT

To remove a solid tire from a wheel over which that tire has been pressed, a transverse groove is cut in the tread of the tire with a cutting apparatus so as to expose the underlying rim. Then the exposed portion of the rim is cut with a flame that is passed through the groove. Once the rim is severed, the tire is easily dislodged from the rim. The cutting apparatus includes a base on which the wheel is positioned and slideways extended away from the base generally parallel to the axis of rotation for the wheel on the base. A slide is located along the slideways. The slide carries a knife that is elongated in the direction of slide movement. The knife has a free end provided with a point and cutting edges diverging from the point. A threaded screw when turned down moves the slide and the knife thereon, and the path of the knife is such that its point enters the tire at one side of its tread and after passing axially through the tread emerges from the other side. In so doing, the knife cuts a segment from the tread so as to leave a transverse groove in the tread.

19 Claims, 10 Drawing Figures

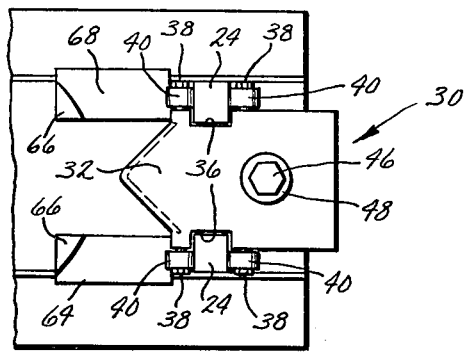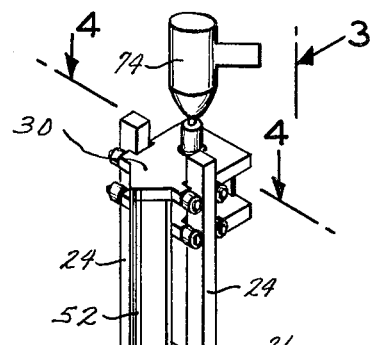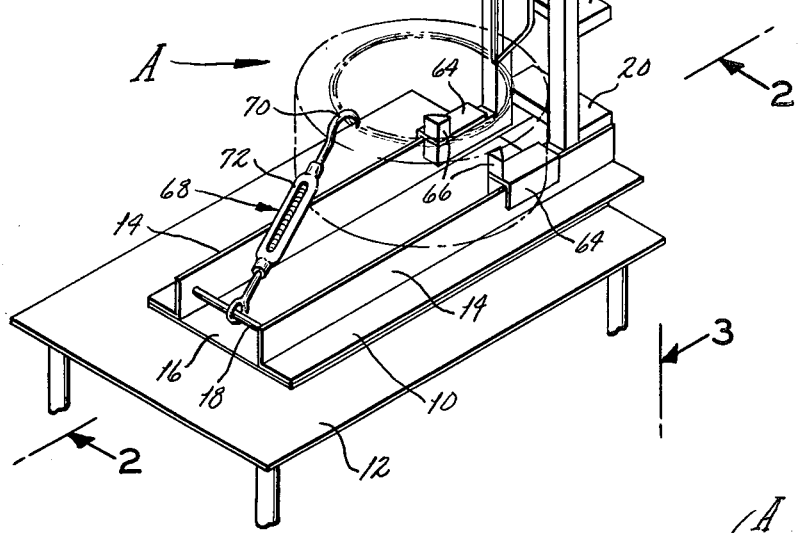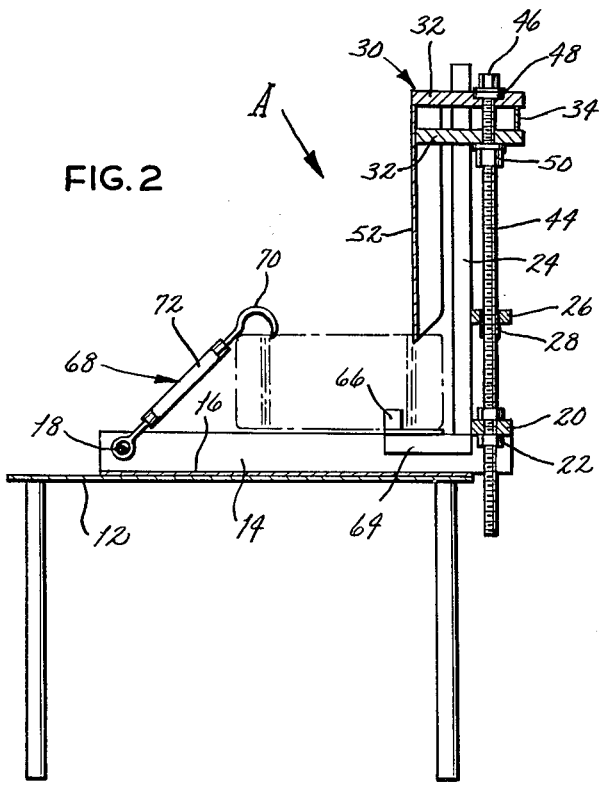

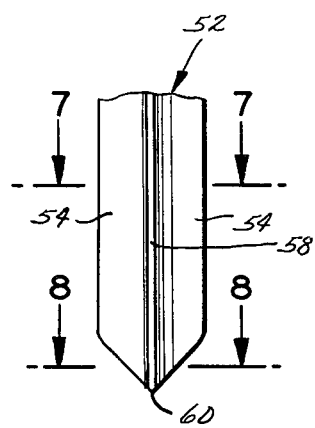
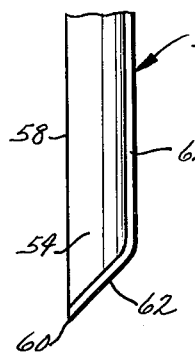
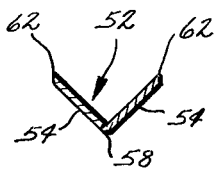
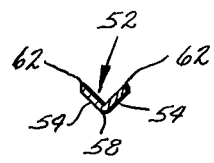
FIG. 5   FIG. 6   FIG. 7   FIG. 8
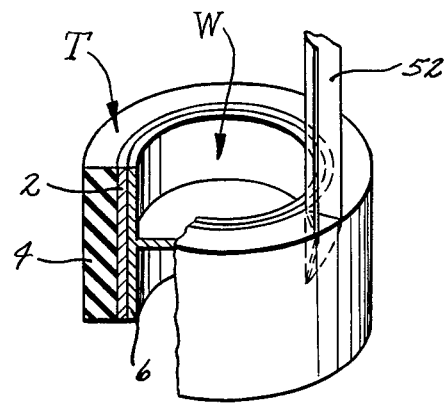
FIG. 9
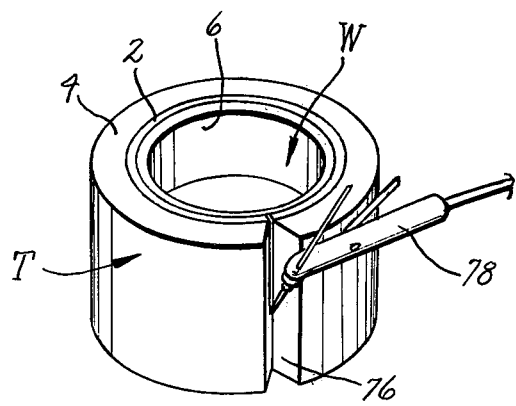
FIG. 10

APPARATUS AND METHOD FOR REMOVING TIRES FROM WHEELS

BACKGROUND OF THE INVENTION

This invention relates in general to solid tires for vehicles, and more particularly to an apparatus and process for removing such tires from the wheels on which they are installed.

The wheels of lift trucks and similar industrial vehicles are normally provided with solid rubber tires instead of pneumatic tires, as are most other automotive vehicles, and these tires consist of nothing more than a metal rim and a solid rubber tread bonded to the rim. The tire fits over the outside surface of the wheel and in order to achieve a secure mounting, the inside diameter of the rim must be small enough to provide an interference fit between the rim and the wheel. Hence, the tire is secured to the wheel by nothing than the friction of the interference fit. Installation of the tire on the wheel requires a heavy press, but the procedure itself is relatively simple. Usually a lubricant is spread over the inside surface of the rim to reduce the force necessary to press the tire in place.

Of course, the tread of the tire wears down during use, and it is also not uncommon for the tread to acquire large nicks, gouges, and cuts along its side edges as a result of the vehicle coming against sharp metal objects, curbs, and the like. In time, the tread wears out, requiring replacement of the complete tire.

Removing a worn tire from its wheel is not nearly so easy as installing a new tire over the same wheel. The common procedure likewise involves the use of a press, but normally the force required to press the tire off the rim is substantially greater than that necessary for installing the tire. For example, where a 40 ton press is often adequate for installing a tire, a 100 ton press is normally required to remove the tire, and often a press of that size is inadequate. The difficulty derives from the fact that oxidation of both the wheel and rim occurs at the interface between the two and this oxidation in effect unites the wheel and the rim of the tire. Also impacts between the rim and hard objects during use not only damage the side of the tire, but further peen the end edge of the rim slightly over the end of the wheel, thereby compounding the removal problem. The problem is particularly acute in the case of large diameter wheels and so called dual wheels, which are twice the width of conventional wheels.

When the presses at a repair shop prove inadequate, the shop normally locates an even larger press at some other location for removing the tire. This can often be inconvenient. Another alternative is to burn the tire off of the rim, and then sever the rim so that it falls off of the wheel. Usually an oxy-acetylene cutting torch is used for this purpose. The flame from the torch is first applied to the rubber tread to burn a groove completely across the tread, and this groove is deep enough to expose the metal of the rim. However, the thick rubber does not burn rapidly and when it does large amounts of dense black smoke are produced. It is not uncommon to require at least an hour of burning to provide a suitable groove in the tread. Once the groove is finished, the steel rim, which is typically about ¼ inch thick, is cut through the base of the groove.

SUMMARY OF THE INVENTION

One of the principal objects of the present invention is to provide an apparatus for easily producing a transverse groove in the tread of a solid rubber tire so that an arc-air or carbide cutter may be run through the groove to sever the metal rim of the tire and thereby free the tire from the wheel on which it is mounted. Another object is to provide an apparatus of the type stated which is simple and durable in construction and easy to operate. A further object is to provide an apparatus of the type stated which provides a groove without burning the rubber tread away from the metal rim. An additional object is to provide a process for easily removing tires from the wheels on which they are mounted. These and other objects and advantages will become apparent hereinafter.

The present invention resides in an apparatus including a base capable of supporting a tire, cutting means for cutting the tread of a tire, and force-imparting means for causing relative movement between the tire and the base so as to cut a groove in the tread of the tire. The invention further resides in a process including cutting a transverse groove in the tread of a tire and cutting the rim of the tire. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a cutting tool for cutting a groove in the solid tread of a tire to facilitate removal of the tire from a wheel, the wheel and tire being illustrated in phantom;

FIG. 2 is a sectional view of the cutting tool taken along line 2—2 of FIG. 1.

FIG. 3 is a rear elevational view of the cutting tool taken along line 3—3 of FIG. 1;

FIG. 4 is a partial top plan view of the cutting tool taken along line 4—4 of FIG. 1;

FIG. 5 is a fragmentary enlarged front view of the knife for the tool;

FIG. 6 is a fragmentary enlarged side elevational view of the knife;

FIG. 7 is a sectional view of the knife taken along line 7—7 of FIG. 5;

FIG. 8 is a sectional view of the knife taken along line 8—8 of FIG. 5.

FIG. 9 is a perspective view of the wheel and tire showing the knife advancing through the tread of the tire; and FIG. 10 is a perspective view of the wheel and tire showing a groove in the tread of the tire and the rim of the tire being cut with the flame from an arc-air cutter.

DETAILED DESCRIPTION

Referring now to the drawings, A designates a cutting apparatus (FIG. 1) useful in removing solid tires T (FIG. 9) from wheels W of the type found on industrial lift trucks and the like. The tire T includes a metal rim 2 and a solid rubber tread 4 that is bonded to the outside surface of the rim 2. The wheel W, on the other hand, has a center web and flanges 6 extended axially from that web. Thus the wheel W on each of its sides has a cupped appearance. The inside surface of the rim 2 is cylindrical and when unstressed is slightly smaller in diameter than the outside surface of the wheel flanges 6 so that an interference fit exists between the wheel W and the rim 2 when the tire T is installed on the wheel W. This installation is achieved by lubricating the inside face of the rim 2 and then pressing the rim 2 over the wheel W with substantial force. The friction between the rim 2 and wheel flanges 6 holds the tire T in place. However, through the passage of time oxidation of the steel rim 2 and wheel W occurs, causing the rim 2 and wheel W to bond tightly together. Also, impacts between the rim 2 and hard objects tend to peen the edge of the rim 2 over the outside face of the wheel W at the periphery of the wheel W. The oxidation and peening render the rim 2 extremely difficult to dislodge from the wheel W.

The cutting apparatus A includes (FIG. 1) a base 10 that is supported on and secured firmly to an elevated platform 12 which may be the top of a work table. The base 10 consists of a pair of angle members 14 arranged parallel to each other, each having one of its flanges in a horizontal disposition and the other of its flanges in a vertical disposition. The horizontal flanges of the two members 14 are projected outwardly away from each other and are welded to a base plate 16 that underlies the two members 14, spanning the space between them. The vertical flanges of the two members 14 are parallel and spaced apart. At one end of the base 10, these flanges are connected by a cross rod 18. At the opposite end they are connected by a cross bar 20 (FIGS. 2 and 3) having a nut 22 located in it midway between the two members 14.

Projecting upwardly from the base 10 are guide posts 24 (FIGS. 2 and 3) which are parallel and are welded to the inside faces of the vertical flanges for the two angle markers 14 as well as to the cross bar 20. Thus, the guide posts 24 are set inwardly from angle members 14. Joining the two guide posts 24 is another cross bar 26 located above the cross bar 20, and this cross bar is fitted with a bushing 28 that axially aligns with the nut 22 in the cross bar 20.

The two guide posts 24, in effect, constitute slideways on which a slide 30 moves, and that slide consists of (FIGS. 2–4) spaced apart blocks 32 having spacers 34 interposed between them, with the spacers 34 being set outwardly away from the guide posts 24. The blocks 32 along their sides have rectangular notches 36 (FIG. 4) which receive the sides of the guide posts 24. Threaded into the blocks 32 at each of the notches 36 therein are shoulder bolts 38 which are parallel to the front and back faces of the guide post 24, and the shoulder bolts 38 serve as journals for rollers 40 which roll along the front and back faces of the posts 24. In other words, each block 30 carries two pairs of rollers 40, there being one pair at each notch 36 in the block 30. The one guide post 24 fits between the one pair of rollers 40, while the other guide post 24 fits between the other pair of rollers. The rollers 40 and the notches 36 confine the slide 30 in the lateral direction, but do not impede it from moving in the vertical direction. Thus, the slide 30 moves easily up and down the guide posts 24. While the rollers 40 tend to stabilize the slide 30 along the guide posts 24, they are not absolutely necessary since adequate guidance may be achieved merely with the notches 36. The two slide blocks 32 contain circular apertures 42 which align with each other as well as with the bushing 28 of the upper cross bar 26 and the nut 22 of the lower cross bar 20.

Extended through the aligned circular apertures 42 of the slide 30 and likewise through the bushing 28 in the upper cross bar 26 is a threaded drive shaft 44 which at its lower end threads through the nut 22 on the lower cross bar 26. The shaft 44 has a right-hand thread so that rotation in the clockwise direction causes it to advance downwardly through the lower plate 20. On the other hand, rotation in the counterclockwise direction causes the shaft 44 to withdraw from the lower cross bar 20. At its upper end, the shaft 44 has a hexagonal head 46 corresponding in size to a conventional bolt head so that it may be engaged by a socket or other type wrench. Directly below the head 46 is a thrust bearing 48 so that any downwardly directed force exerted by the head 46 is transferred to the upper block 32 of the slide 30 through the thrust bearing 48. Directly beneath the lower block 32 of the slide 30, the shaft 44 is fitted with a collar 50. Thus, the slide 30 is confined vertically on the shaft 44 in one direction by the shaft head 46 and thrust bearing 48 and in the other direction by the collar 50.

The slide 30 carries a tread cutting knife 52 (FIGS. 5–8) that is elongated in the direction of the guide posts 24 and extends downwardly from the slide 30 ahead of the guide posts 24 and generally parallel thereto. In cross section, the cutting knife 52 has two blades 54 and 56 which are oriented at 90° with respect to each other and at 45° with respect to the vertical flanges of the angle members 14 on the base 10. The two blades 54 and 56 are joined together along an apex 58 which forms the forward or leading edge of the knife 52. Actually, the edge or apex 58 is somewhat flattened, having a width of about one-half inch. At its upper inch, the knife 52, along its two blades 54 and 56, is welded or otherwise firmly secured to the upper and lower blocks 32 of the slide 30 (FIGS. 1 and 2). The lower end of the knife 52 is completely free of the slide 30 as well as the posts 24 and base 10, and here the two blades 54 and 56 taper down to a point 60 located along the apex 58. This taper possesses an angle of between 40° and 70° with respect to the front edge of apex 58 of the knife 52 and is preferably 63°. Moreover, the free edges of the blades 54 and 56, that is the vertical edges located remote from the apex 58 and the tapered edges leading up to the point 60 are beveled down to sharp cutting edges 62. The bevel for each blade 54 or 56 is at about 45° with respect to the major surface area of that blade and is such that the beveled surface is parallel to vertical flanges on the angle members 14 of the base 10.

In front of the two guide posts 14, a pair of rim supporting shoes 64 (FIGS. 1 and 4) project inwardly from the vertical flanges of the two angle members 14, and these shoes are provided with upwardly directed locating lugs 66 that are presented above the upper edges of the vertical flanges on the members 14. The lugs 66 are located directly in front of the guide posts 24 and are spaced far enough from these posts to enable a small segment of the tire T and underlying wheel flange 6 to fit between the lugs 66 and posts 24 with the tread 4 of the tire positioned directly beneath the knife 52. Actually the point 60 of the knife 52 aligns with the portion of the tire tread 4 located against the rim 2.

Finally, attached to the cross rod 18 is a holddown device 68 (FIGS. 1 and 2) including a hook 70 capable of engaging the flange 6 of the wheel W and a turnbuckle 74 that attaches to the cross rod 18 at its one end and to the hook 70 at its other end. The hold-down device 68 prevents the tire T from lifting upwardly at its one end when a downwardly directed force is applied to the tread 4 at the opposite end by the knife 52.

OPERATION

The machine A is prepared for use by turning the threaded shaft 44 counterclockwise to elevate the slide 30 to a starting position in which the point 60 of the knife 52 is above the rim supporting shoes 64 a distance that exceeds the width of the tire T. The wheel W, after having been removed from its hub on the vehicle, is then turned to a horizontal disposition and lifted upwardly onto the base 10 so that the downwardly presented edges of the rim 2 rest on the upper edges of the vertical flanges for the angle members 14 and on the shoes 64 (FIGS. 1 and 2). The wheel W is positioned such that a segment of its downwardly directed flange 6 is located immediately behind the lugs 66 on the base 10 so that the lugs 66 prevent the wheel W from sliding away from the posts 24. When so disposed, another segment of the wheel W will be located adjacent to the hold-down device 68. The hook 70 of this device is engaged with the upwardly directed wheel flange 6, and then the turnbuckle 72 is rotated to clamp that end of the wheel W securely in place. In addition, the blades 54 of the knife 52 are coated with a suitable lubricant, which may be a soap solution.

Once the wheel W is positioned in the foregoing manner on the base 10, an impact wrench 74 (FIG. 1) or any other suitable turning device is fitted over the hexagonal head 46 of the threaded shaft 44 and the shaft 44 is rotated in the clockwise direction. As a result, the shaft 44 moves through the nut 22 in the lower crossbar 20, and the entire slide 30 descends. After a short distance, the point 60 of the knife 52 will approach the tread 4 on the tire T, but before the point comes into contact with the tire T, the knife 52 is manually manipulated either inwardly or outwardly to align the point 60 with the interface between the rim 2 and the tread 4. Thus, the point 60 penetrates the tread 4 immediately adjacent to the rim 2. The rotating shaft 44 continues to advance the knife 52, and as it does, the cutting edges 62 along the free ends of the blades 54 and 56 cut into the rubber of the tread, providing two slices or cuts which converge toward the rim 2 (FIG. 9). These slices or cuts become progressively longer as the knife 52 moves deeper into the tread 4 and eventually they extend all the way out to the outer or circumferential surface of the tread 4. At this time, the shaft 44 exerts a substantial downwardly directed force on the slide 30, and this force is transmitted to the slide through the head 46 of the shaft 44 and the thrust bearing 48.

The knife 52 continues to advance through the tread 4 with the apex 58 of the knife 52 passing close to or against the outwardly presented surface of the rim 2. Eventually, the point 60 of the knife 52 emerges from the opposite side of the tread 4 and passes downwardly into the space between the vertical flanges of the two angle members 14 on the base 10. The diverging cuts thereafter propogate along the other side of the tread, and after the knife 52 advances slightly further, those cuts extend all the way out to the outer or circumferential surface for the tread 4. At this time, the wedge-shaped segment behind the knife 52 is completely severed from the tread 4, leaving a V-shaped groove 76 (FIG. 10) in the tread 4. The groove 76, having been cut by the knife 52, possesses substantially the same cross sectional configuration as the knife 52 and extends practically all the way inwardly to the rim 2. Due to the presence of the flattened apex 58 on the knife 52, the base of the groove 76 is likewise flattened.

Once the groove 76 is formed, the knife 52 is retracted by turning the threaded shaft 44 counterclockwise. Then the hold-down device 68 is released by turning its turnbuckle 78. This permits the entire wheel W as well as the tire T extended around it to be lifted off of the base 10.

The wheel W which is removed from the apparatus A has its rim 2 exposed at the bottom of the groove 76 in the tread 4. The removal of the tire T is completed with an arc-air cutting torch 78 (FIG. 10) by directing the flame of the torch 78 against the exposed portion of the rim 2 at the bottom of the V-shaped groove 76. This severs the rim 2 so that it is easily freed from the wheel W. While the flame ignites some of the rubber along the groove 76, the rubber which does burn is minimal so that very little smoke is produced. Certainly considerably less smoke develops than would occur if the torch were used to burn the rubber away from the rim 2 as is the conventional practice.

The rim 2 may also be severed by a motorized carbide cutter, the cutting wheel of which is passed through the V-shaped groove 76.

This invention is intended to cover all changes and modifications of the example of the invention herein chosen for purposes of the disclosure which do not constitute departures from the spirit and scope of the invention.

What is claimed is:

1. An apparatus for cutting a transverse groove through the solid tread of a tire so as to provide easier access to a rim underlying the tread, said apparatus comprising: a base configured to support a tire thereon; cutting means for cutting the tread of the tire; and force imparting means for causing relative movement between tire and the cutting means such that the cutting means passes through the tread of the tire, but not the rim, and cuts a transverse groove therein.

2. An apparatus according to claim 1 wherein the cutting means is a knife having cutting edges thereon.

3. An apparatus according to claim 2 wherein the knife has a free end at which the cutting edges are located and is trough-shaped with its concave face being presented outwardly away from the rim as the relative movement occurs during which the groove is cut in the tread.

4. An apparatus according to claim 3 wherein the knife is elongated along a longitudinal axes that is generally parallel to the axis of rotation for the tire when the tire is on the base, and the relative movement produced by the force-imparting means is generally parallel to the longitudinal axis of the knife.

5. An apparatus according to claim 4 wherein the knife has a point at its free end, with the point being along that surface of the knife which is closest to the rim of the tire as the cut is made; and wherein the cutting edges diverge from the point.

6. A apparatus according to claim 4 wherein the knife comprises two blades which are arranged at an angle with respect to each other and are joined along an apex that is presented closest to the rim of the tire as the cut in the tread is made; and wherein the cutting edges are located at the free end of the knife along the blades and converge toward a point that is along the apex.

7. An apparatus according to clam 6 wherein the apex is somewhat flattened.

8. An apparatus according to claim 4 wherein the force imparting means comprises a slideway extending in the direction of relative movement between the slide and the base, a slide located on the slideway for movement along it, and means for moving the slide; and wherein the knife is mounted firmly on the slide.

9. An apparatus according to claim 8 wherein the means for moving the slide is a threaded shaft that extends through the slide.

10. An apparatus according to claim 8 and further comprising means on the base for positioning a wheel having a tire thereon in a predetermined position with respect to the knife, said position causing the knife blade to enter the tread at one side thereof and emerge from the tread at the other side thereof.

11. An apparatus according to claim 8 wherein the base supports the wheel in a generally horizontal disposition with its axis of rotation being generally vertical, and the slideways extend upwardly from the base.

12. An apparatus for cutting a transverse groove in the tread of a solid tire that is mounted on a wheel with the tire having a metal rim that is fitted tightly around the wheel, said apparatus comprising: a base configured to support a wheel having a solid tire thereon; a slideway extended away from the base generally parallel to the axis of rotation for the wheel positioned on the base; a slide located on and movable along the slideway; an elongated knife mounted on the slide and having its longitudinal axis extended in the direction of movement of the slide along the slideway, the knife having a free end along which the cutting edges are located with the free end being aligned with the tire tread when the tire is on the base; and means for moving the slide along the slideway so as to cause the knife to enter the tread and cut a transverse groove thereon.

13. An apparatus according to claim 12 wherein the knife has a point at its free end and the cutting edges converge to the point.

14. An apparatus according to claim 13 wherein the knife comprises a pair of blades arranged at an angle with respect to each other and joined together along an apex, with the apex being presented toward the rim of the tire as the knife passes through the tread of the tire.

15. An apparatus according to claim 14 wherein the point of the knife is along the apex.

16. A process for freeing a tire from a wheel over which the tire has been pressed to be fitted snugly thereon, the tire having a metal rim that is against the wheel and a solid tread that is bonded to the rim, said process comprising: cutting a groove in the tread of the tire with the groove being extended generally in the axial direction; and severing the rim along the base of the groove so that the rim expands sufficiently to free it from the wheel.

17. A process according to claim 16 wherein the depth of the groove is substantially the thickness of the tread.

18. A process according to claim 17 wherein the step of severing the rim comprises cutting the rim with a flame directed through the groove at the portion of the rim along the base of the groove.

19. A process according to claim 16 wherein the step of cutting the groove comprises passing an elongated knife through the tread of the tire from one side of the tire to the other side with the direction of movement for the knife being generally parallel to the axis of rotation for the wheel.

* * * * *